United States Patent
Arai et al.

(10) Patent No.: US 6,962,287 B2
(45) Date of Patent: Nov. 8, 2005

(54) INFORMATION ACCESS DEVICE AND INFORMATION DELIVERY SYSTEM

(75) Inventors: Toshifumi Arai, Ibaraki (JP); Kazunori Andou, Kanagawa (JP); Munetaka Itami, Kanagawa (JP)

(73) Assignees: Hitachi, Ltd., Tokyo (JP); Hitachi Information Technology, Kanagawa (JP); Hitachi Device Engineering Co., Chiba (JP)

( * ) Notice: Subject to any disclaimer, the term of this patent is extended or adjusted under 35 U.S.C. 154(b) by 176 days.

(21) Appl. No.: 10/407,263

(22) Filed: Apr. 3, 2003

(65) Prior Publication Data

US 2004/0011867 A1 Jan. 22, 2004

(30) Foreign Application Priority Data

Jul. 22, 2002 (JP) ........................... 2002-212065

(51) Int. Cl.[7] ............................................. G06K 5/00
(52) U.S. Cl. ........................ 235/382; 235/375; 235/376
(58) Field of Search .............................. 235/382, 375, 235/376, 451, 492; 705/14

(56) References Cited

U.S. PATENT DOCUMENTS

| | | | |
|---|---|---|---|
| 4,578,567 A | * 3/1986 | Granzow et al. | 235/380 |
| 5,778,182 A | * 7/1998 | Cathey et al. | 709/219 |
| 5,905,248 A | 5/1999 | Russell et al. | |
| 6,009,415 A | * 12/1999 | Shurling et al. | 705/35 |
| 6,424,949 B1 | * 7/2002 | Deaton et al. | 705/14 |
| 6,792,452 B1 | * 9/2004 | Philyaw | 709/217 |

FOREIGN PATENT DOCUMENTS

| | | |
|---|---|---|
| EP | 01-004971 | 5/2000 |
| JP | 10-171758 | 6/1998 |
| JP | 2000-267966 | 9/2000 |
| JP | 2001-197059 | 7/2001 |

OTHER PUBLICATIONS

"Digital: Convergence Deploys Millions of: CueCat™ Devices and :CRQ™ Software Free to American Consumers", Press Releases, 2001 Digital : Convergence Corporation.

* cited by examiner

Primary Examiner—Thien M. Le
Assistant Examiner—Kimberly D. Nguyen
(74) Attorney, Agent, or Firm—Hogan & Hartson, LLP

(57) ABSTRACT

The present invention concerns an information access device for utilizing a supposed information service, which possesses an information-inputting device. The information access device according to one embodiment of the present invention comprises a usage discrimination part which judges whether the information-inputting device is utilized for said intended information service or unintended usage, based on prescribed information from said information inputting device.

10 Claims, 11 Drawing Sheets

| ID | URL | POINT | COUNT |
|---|---|---|---|
| 100001 | http://www.hitachi.co.jp/ | 10 | 23104 |
| 100002 | http://www.hitachi.com/ | 8 | 18742 |

1203, 1211, 1212, 1213, 1214

601

If you wish to continuously use the device, please access the following site: http://www.LinkStick.com/

INFORMATION ACCESS DEVICE AND INFORMATION DELIVERY SYSTEM

BACKGROUND ARTS

1. Field of the Invention

The present invention relates to an information access system and peripherals thereof, and particularly to an information-inputting system and an information service system.

2. Description of the Related Arts

An information access system utilized for information delivery service or such include personal computer (hereinafter referred to as "PC"), Internet Appliance (hereinafter referred to as "IA"), and personal digital assistant (hereinafter referred to as "PDA") in a form of an electric diary for referring information stored on Internet and peripherals thereof to be connected thereto, particularly a code-information inputting device, which utilizes an image sensor.

Japanese Patent Laid-Open No. 10-171758 discloses one example of a system utilizing an information delivery service. Here, concerning the main constituent of the information delivery service, a number is insured corresponding to the information provided from Internet and the like to centralize the correspondence of the number and the information. The number used therein is hereinafter referred to as "linked information". The linked information is printed in the form of a bar code or the like on an advertisement or an article placed on a magazine etc. The printed linked information is hereinafter referred to as "linked symbol".

A user acquires a bar code reader and an information access program from the main constituent of the information delivery system to install them into the user's PC. In many cases, the bar code reader and the information access program are distributed to the user freely or at a low price. A device for accessing some kinds of information as described above, including a bar code reader, is hereinafter referred to as an "information access device".

First, the user acquires a link symbol embedded into an interested advertisement or article and then scan it by a bar code reader having been installed into the user's PC.

The information access program having been installed into the PC sends the link information obtainable from the linked symbol, which has been scanned, (in this case, the number assigned to the information on Internet), via a network connected to PC, to a link relay server possessed by the main constituent of the information delivery service.

The link relay server identifies the information on Internet, which will be accessed by the user, and relays the information to be delivered to the user's PC.

As described above, by making it easy to access from a printed medium such as a magazine, the associated information on Internet, an additional worth of the printed medium is enhanced, and an access number of the information on Internet can be expected to be increased.

It is also possible to collect a commission from a source of providing information (for instance, an advertiser company, which is put in the magazine). Alternatively or in addition, by enhancing an additional worth of the printed medium, the main constituent of the information delivery service can expect to increase profit obtainable therefrom such as profit through the advertisement and a fee for reading magazine.

As described above, the usage, which concerns the profit of the main constituent of the information delivery service, (e.g., in the case of the prior art, to scan linked symbol through the information access device to thereby access a kind of information), will be hereinafter referred to as (the supposed usage or intended usage").

The bar code reader and the program for information access device provided from the main constituent of the information delivery service are configured so that they can be utilized only for the intended usage, i.e., the usage where the linked symbol having been printed is scanned. For example, the bar code attached for the purpose of managing goods is configured no to be read.

In the techniques associated with the prior arts described above, the information access device acquired by the user from the main constituent of the information delivery service and peripherals therefor including the bar code reader can only be used for the intended usage, i.e., the usage which gets profit by the main constituent of the information delivery service (in this case, reading of information through scanning the linked symbol having been printed). It can be said this disables the functions inherently possessed by the bar code reader such as a function for reading a bar code for managing goods.

Such a restriction weakens motivation for always connecting the bar code reader to PC, which then makes it difficult to increase the operation rate of the bar code reader, i.e., which makes it difficult to increase scanning frequency of the linked symbol.

If the bar code reader is used for usage other than the intended usage, i.e., if it is used for the usage where bar code other than the linked symbol is scanned, there is a possibility that the user will solely utilize the bar code reader only for the later usage. In the present specification, the usage other than the intended usage is referred to as "unintended usage".

If the user only uses the bar code reader for any usage other than the intended usage, i.e., if the user does not scan the linked symbol, the main constituent of the information delivery service earns any profit only with difficulty. In such a situation, the main constituent of the information delivery service cannot recover the cost required for delivery access device, in this case, the bar code reader and the program for accessing information. For this reason, the bar code reader in which the main constituent of the information delivery service distributes to a user is configured so that it cannot be diverted to unintended usage.

In the case of the information access device, which only can be used in the intended usage, there is a possibility to motivate a third party to distribute a program, which allows the information access device to be used for other purpose. For example, there is a possibility that someone prepares and distributes a program in which a bar code for managing goods can be scanned to display the results of scanning. If someone distributes such a kind of program, the user will only use the information access device for unintended usage, which will result in the situation where it is difficult for the main constituent of the information delivery service to recover the cost required for distributing the information access device.

In the prior art described above, the information access device is to use the bar code reader. However, a system can be considered in which a linked symbol is read, e.g., through a camera capable of being connected to PC.

In this case, if the usages as a camera such as taking an image for attaching an electric mail or inputting picture for television congress are inhibited, the inherently possessed by the device will greatly lost. In such a situation, the motivation for always connecting the camera to PC is weaken, and the possibility that the program for diverting the device to unintended usage will be distributed by someone will be much more increased. Hereinafter the bar code reader, camera and the like will be collectively called an "image-inputting device" or "information inputting device".

In light of the problems associated with the prior art, the object of the present invention is to provide an information access device, which can be used for usage other than the intended usage in order to increase the rate of the operation of the information access device for information delivery service, and which can motivate the user to use the device for the intended usage, and to provide an information delivery system using the same.

Another object of the present invention is to provide a new business of the main constituent of the information delivery service using the information access device.

SUMMARY OF THE INVENTION

The present invention concerns an information access device for utilizing a supposed information service, which possesses an information-inputting device. The information access device according to one embodiment of the present invention comprises a usage discrimination part which judges whether the information-inputting device is utilized for said intended information service or unintended usage, based on prescribed information from said information inputting device.

The present invention is also directed to an information access device possessing an image-inputting device and a personal computer, which is utilized for an information delivery service. The information access device according another embodiment of the present invention comprises as functions of said personal computer: a driver for inputting link information read from said image-inputting device; an information access part which accesses said information delivery service based on the link information from said driver; a usage discrimination part having an available point which is increased by access of said information access part and is decreased by using said driver; and a limiter for unintended usage which restricts the use for unintended usage when said available point is lower than a threshold value.

The present invention further relates to an information delivery system in which an information access device including an information-inputting device distributed freely or at a low price and a server for an information delivery service are connected to a network, and which performs an information delivery service to said information access device. In the information delivery system of the present invention, the information access device comprises usage discrimination part which judges whether the information-inputting device is utilized for said intended information service or unintended usage, based on prescribed information from said information inputting device; and a limiter for unintended usage which restricts the use for unintended usage when said usage discrimination part judges a number or period of usage for unintended usage exceeds a threshold value.

The function of the present invention will be described. The usage discrimination part memories prescribed points, i.e., the available point, at the initial state. The usage discrimination part increases the available point, when it is judged that the information access device is used in the supposed usage, and, conversely decreases the available point, when being judged that the information access device is used in an unintended usage. When the available point is a value not lower than a prescribed level, the information access device can be used not only in the supposed usage but also in the unintended usage.

However, if the available point becomes a value not higher than a given value (threshold value), by the action of the limiter for restricting the unintended usage, the usage of the information access device is expressed. For example, in the case where the information access device utilizes a bar code reader, a possibility of the failure of the bar code scanning is increased. Alternatively, in the case where the information access device utilizes a camera, a deterioration process, such as embedding an unintended pattern, such as an advertisement or a message text, in the image taken through the camera, is carried out. Also, the usage discrimination part may extend or shorten a period or number until the restriction is worked, depending upon the results of the judgment of the usage discrimination part.

As described above, even in the case where the information access device is restricted in unintended usage, it can normally used in the supposed usage. When the information access device is used in the supposed usage, the available point is used. When the available point is increased to some extent, the restriction in the unintended usage is cancelled and then the information access device can also be used in the unintended usage.

According to the process as described above, the information access information can be used in various usages other than the supposed usage, by which the main constituent of the information delivery service can obtain a profit. Accordingly, the possibility that the information access device is always connected to the user's PC is increased. This anticipates that the frequency of the image access device to be utilized in the supposed usage can be increased.

Furthermore, it is required for continuously using information access device in the unintended usage to also use the information access device in the supposed usage in a given proportion and, thus, the present invention can be expected to promote the use of the information access device in the supposed usage. Accordingly, as the usage of the information access device is more available, the use of the information access device in the supposed usage is promoted. This is in contrast the prior art that the use of the information access device in the unintended usage is assumed to be problem.

Furthermore, since the information access device can be used in the unintended usage as it is, the motivation that a program for use in the unintended usage is developed and distributed by someone become weakens. Then, this weakens the possibility that the information access device is only used in the unintended usage by the program distributed by someone and the main constituent of the information delivery service can obtain a profit only with difficulty.

DESCRIPTION OF PREFERRED EMBODIMENTS

Figure 1:
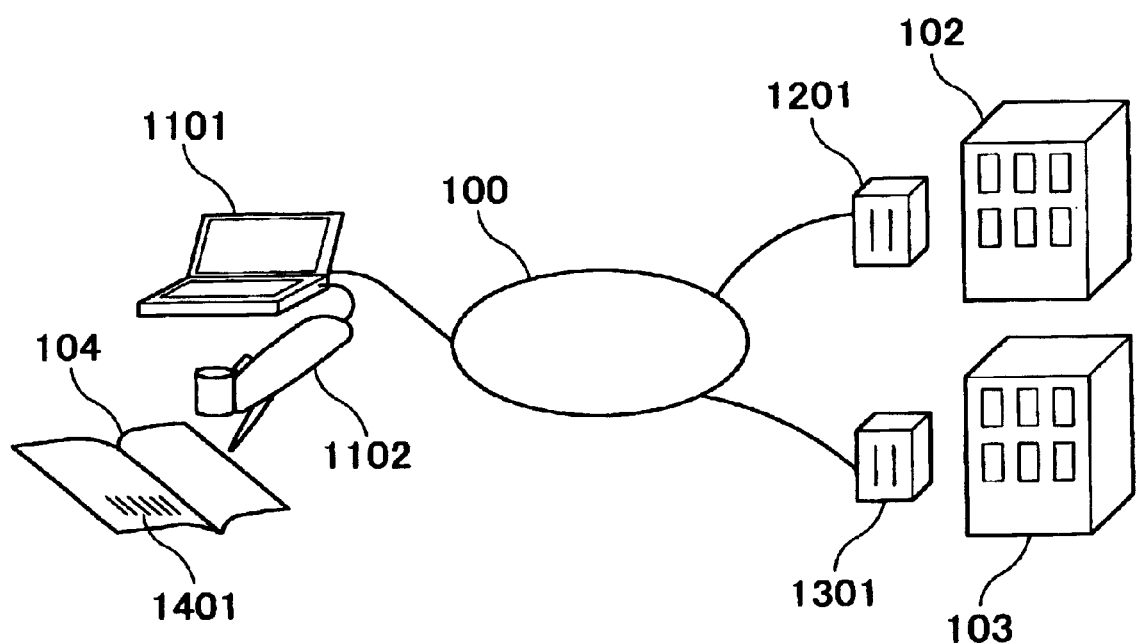
FIG. 1 is a drawing totally showing the configuration of an information delivery system according to one embodiment of the present invention.

Embodiments of the present invention will now be described. FIG. 1 is a drawing totally showing the configuration of an information delivery system according to one embodiment of the present invention. Hardware of the information access device is composed of PC 101, which is a PC, and a camera 1102, which can be connected to the PC. In this embodiment, camera 1102 is used as the information-inputting device or the image-inputting device.

In this embodiment, it is consumed that PC 1101 is provided by the user himself, and the camera 1102 is provided by the main constituent 102 of the information delivery service without any cost. It is also consumed that in this embodiment, the user has already gotten a book 104 published from the main constituent 102 of the information delivery service.

PC 1101 is connected to Internet 100. To Internet 100 are connected a link relay server 1201 managed by the main constituent 102 of the information delivery service, a publicity contents server 1301 managed by an advertiser and the like.

Figure 2:
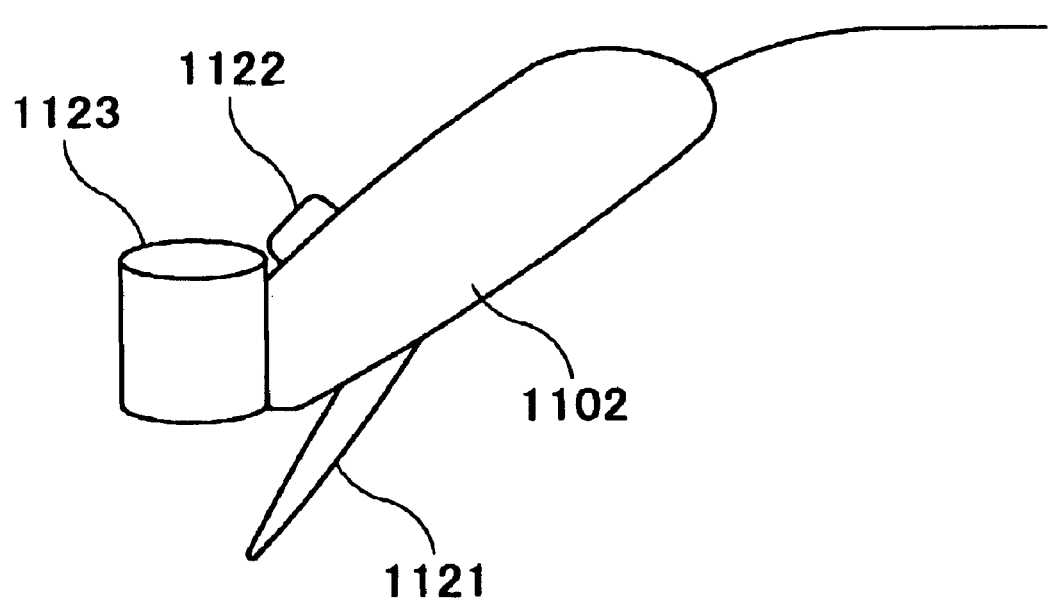
FIG. 2 is a drawing outlining a camera which makes up an inputting part of the information access device.

FIG. 2 shows the configuration of the camera 1102. The user utilizes the camera 1102 to read a linked symbol 1401 printed on the book 104. In this case, an object pointer 1121 is brought into contact with a lower portion of the linked symbol 1401, and then a shutter switch 1122 is pushed. At the time when the user pushes the shutter switch 1122, the camera 1102 takes a photo around the object pointer 1121. For this reason, a camera head 1123 is fit to the camera 1102 in such a manner that the lens is directed downwardly so as to take around the object pointer 1121. The lens is adjusted so as to focus the edge of the object pointer 1121.

In this embodiment, the link information obtainable from the linked symbol is assumed to be a value of six figures. The link information is transmitted to the link relay server 1201 managed by the main constituent 102 of the information delivery service via Internet 100. The link relay server 1201 returns the address on Internet 100 corresponding to the link information to PC 1101.

In this embodiment, the positional information on Internet is assumed to be expressed as URL (Uniform Resource Locater) such as http://www.hitachi.co.jp/, which has been widely utilized for expressing the location of the information on Internet.

PC 1101 can utilize the URL sent from the link relay server 1201 to refer the information associated with the linked symbol 1401. For example, if the linked symbol 1401 is associated with the information on the publicity contents server 1301 managed by the advertiser 103, PC 1101 can read the information via Internet 100 to display the information to the user.

Figure 3:
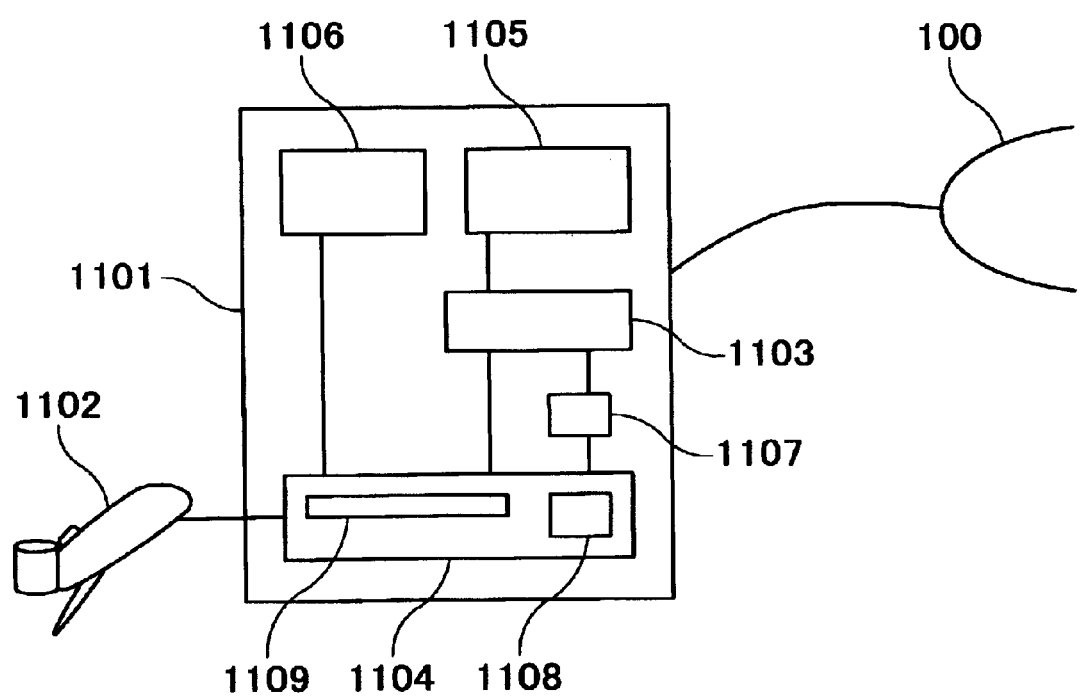
FIG. 3 is a block diagram showing the functions of PC making up the information access device (configuration of program).

Subsequently, the operation of PC 1101 will be described. FIG. 3 is a functional block diagram of PC 1101, and respective functions are produced by a program. Prior to the utilization of the information delivery service, the user connects the camera 1101 to PC 1101, and installs an information access program 1103 and a camera driver 1104. The information access program 1103 and the camera driver 1104 are freely acquired from the main constituent of the information delivery service similar to the camera 1102.

A usage judgment point 1107 in order to judge the usage of the camera 1102 utilized is referred or set from both of the information access program 1103 and the camera driver 1104.

In PC 1101 are installed a browser program 1103 for referring the information on Internet and an image capture program 1106 which displays the image of the camera 1102 on the display and saves the image as a file or such.

When the user points the object pointer 1121 of the camera 1102 to the linked symbol 1401 and then pushes the shutter switch, the camera 1102 takes a photo of the linked symbol and the taken image is transmitted to the camera driver 1104.

The camera driver 1104 is used from all of the programs, which utilizes the camera 1102. Specifically, it is not only used from the information access program 1103 for the intended usage but also from programs other than the intended usage such as the image capture program 1106, which is a program for taking an image to be attached to E-mail.

Generally, the device driver is a program which conceals the differences of the interface depending upon the devices from an application program, and in many cases, the device driver is provided together with the corresponding device. The camera driver 1104 is also the device driver provided together with the camera 1103 and conceals the interface inherent to the camera 1102, and matches the interface to a standard camera interface whereby the camera 1102 can be used from a wide variety of the application programs.

As such a standard camera interface, in the case of "Windows®" which is an operating system of Microsoft Corporation, there is a standard called Video for Windows (hereinafter referred to as "VfW"). If the device driver and the application program are produced compatible with VfW, they can be used in combination therewith.

In the case of this embodiment, if the camera driver 1140 provides an interface compatible with VfW, the camera 1103 can be used together with a wide variety of application programs utilizing a camera compatible with VfW. For example, if the digital camera program is also a program compatible with VfW, it can be used in combination with the camera 1102. It is preferred if the information access program 1103 is also compatible with VfW. In the case of LINUX, which is freely distributed and which has recently been focused, Video 4 Linux (abbreviated as V4L) is ready for a standard interface for a camera.

Figure 5:
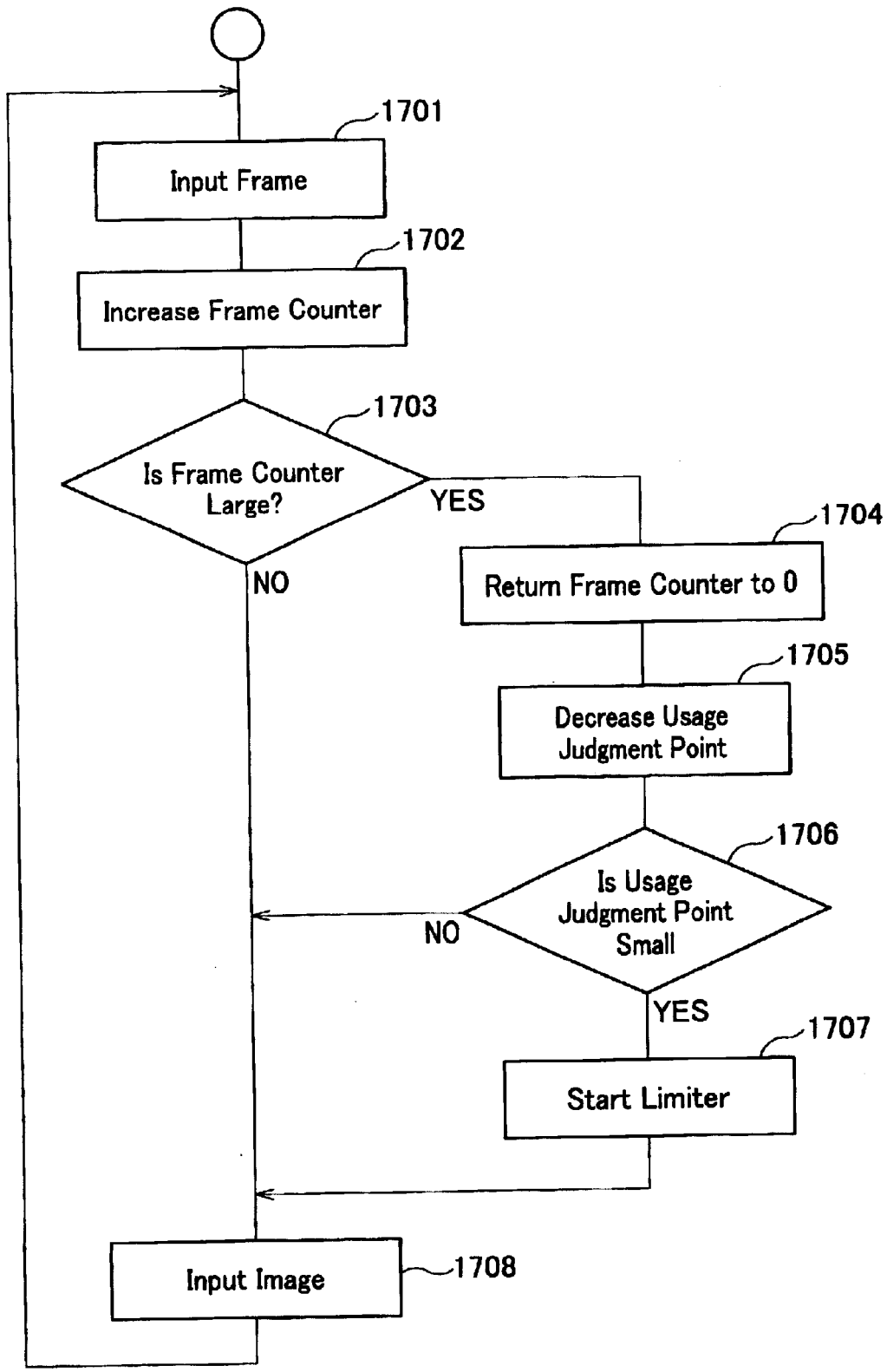
FIG. 5 is a flowchart showing the operation of the camera driver.

FIG. 5 shows the operation of the camera driver. If an image is inputted from the camera 1102 (1701), the camera driver increases the value of a frame counter 1108 one (1702). Then, the camera driver 1104 judges whether or not the value of the frame counter 1108 arrives at a prescribed threshold value, e.g. 300 (1703). If the value arrives at the threshold value, the camera driver 1104 returns the value of the frame counter 1108 to zero (0) (1704). Simultaneously, the value of the usage judgment point 1107 is decreased to a prescribed value, e.g., one (1) (1705), provided that the lower limit of the usage judgment point 1107 is zero, and it does not becomes a value lower than zero.

If the value of the usage judgment point 1107 is equal to or lower than the threshold value (1706), the camera driver 1104 starts limiter for restricting unintended usage 1109, which will be described later on (1707). In Step 1703, if it is judged that the value of the frame counter does not arrive at the prescribed threshold value, the image from the camera 1102 is normally inputted to an upper program (1708).

Figure 6:
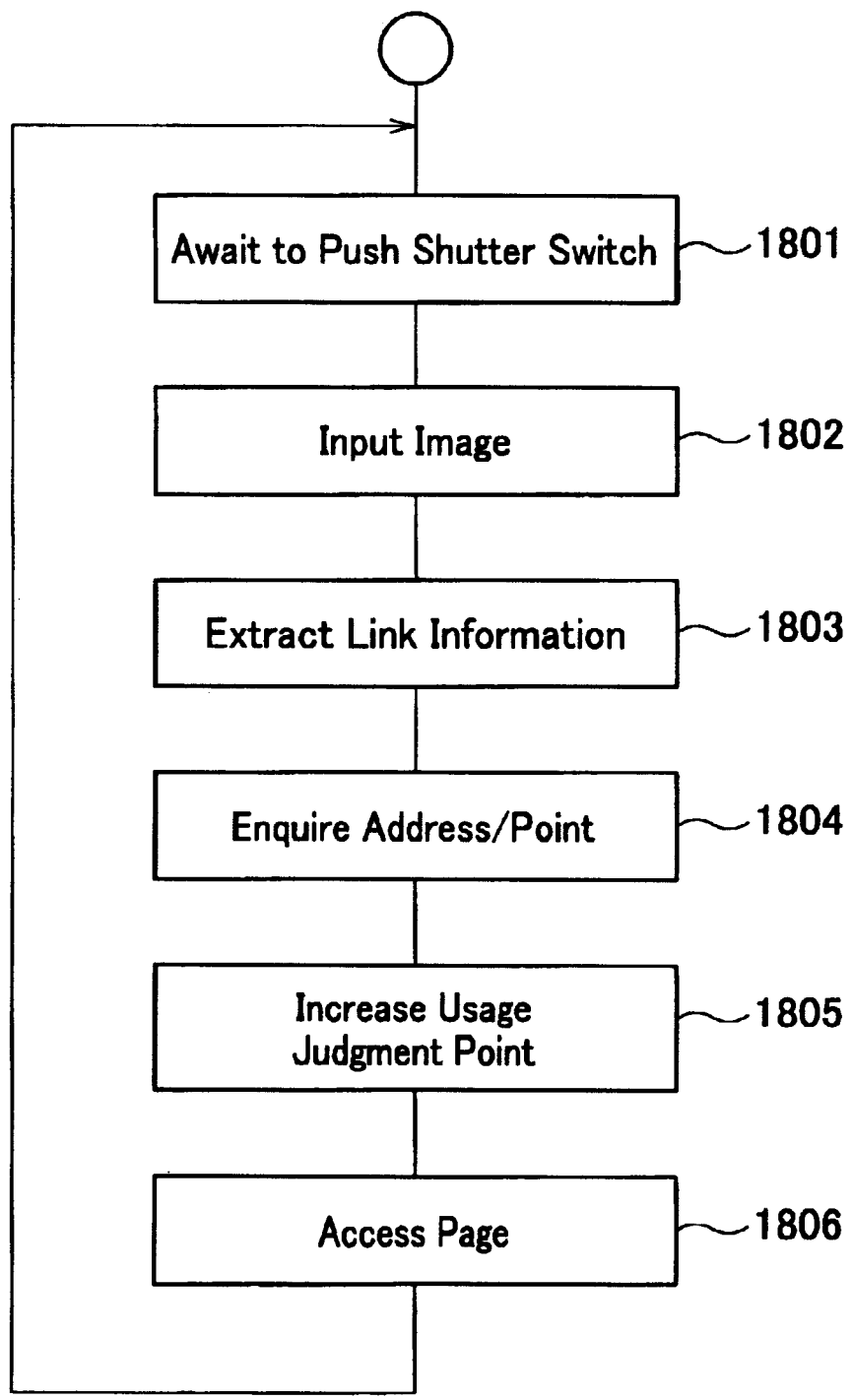
FIG. 6 is a flowchart showing the operation of the information access program.

FIG. 6 shows the operation of the information access program. At the time when the information access program 1103 is under using the camera 1102, if the user pushes the shutter switch 1122 of the camera 1102 (1801), the image taken by the camera 1102 is read by the camera driver 1104 as described above, and then transmitted to the information access program 1103 (1802).

The information access program 1103 extracts the link information from the shape of the linked symbol 1401 in the image (1903), and transmits the link information to the link relay server 1201 via Internet (1804).

Figure 4:
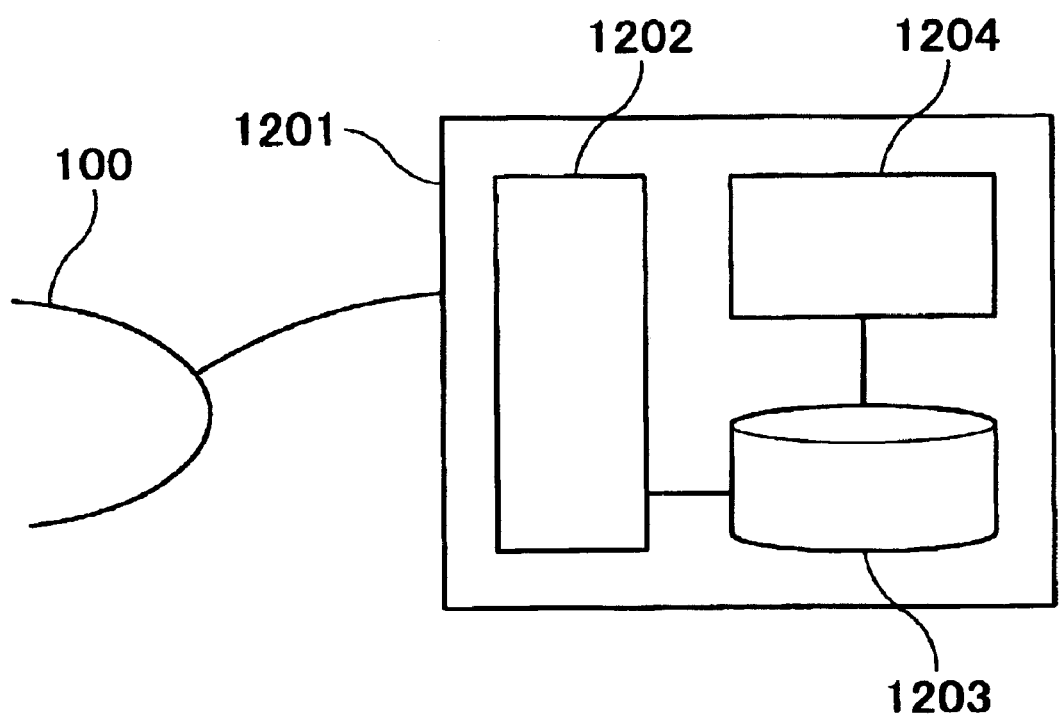
FIG. 4 is a drawing showing the configuration of the link relay server.

The link relay server 1201 will be explained. FIG. 4 shows the configuration of the link relay server 1201. In the link relay server 1201, a link relay program is operated.

Figure 7:
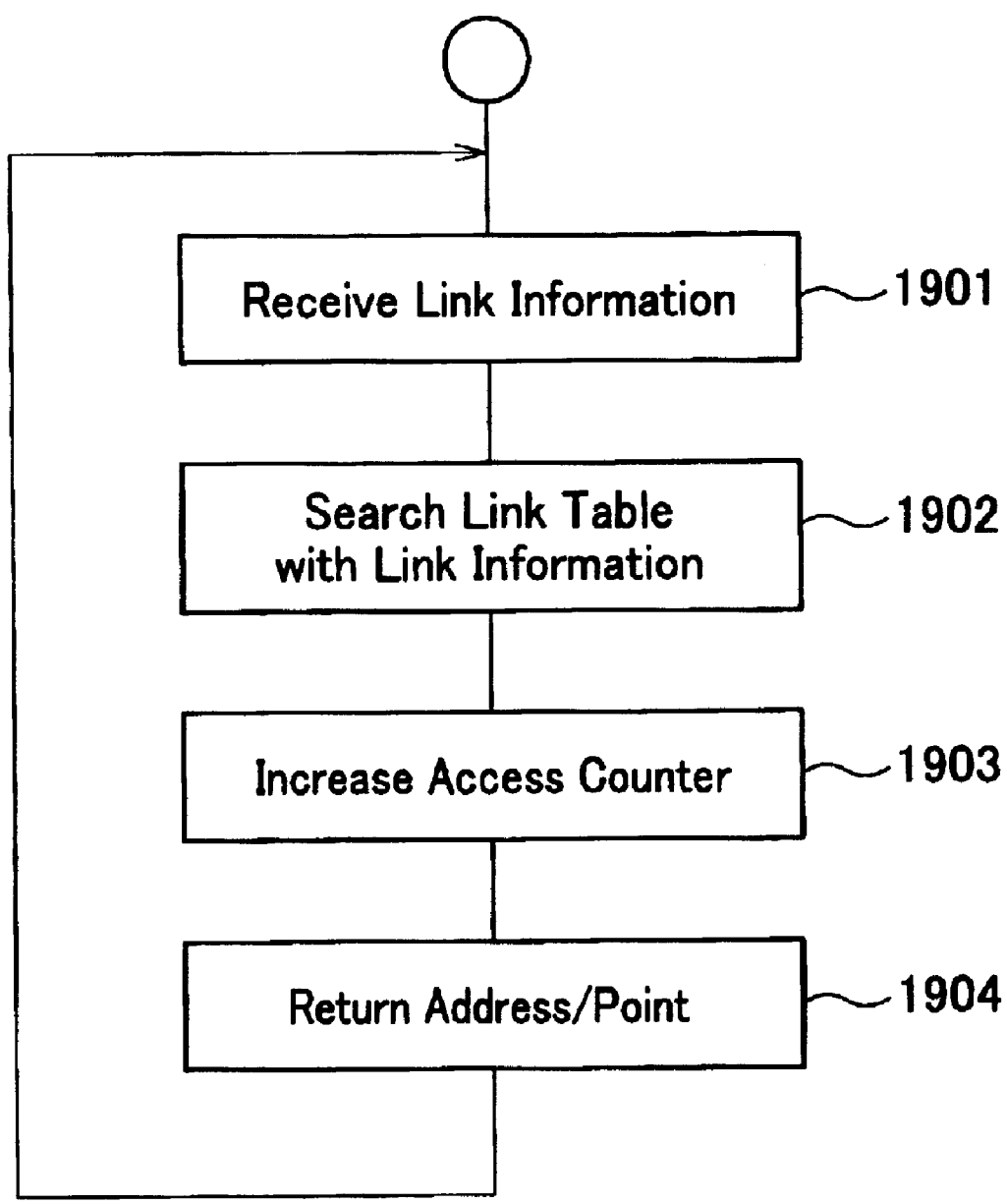
FIG. 7 is a flowchart showing the operation of the link relay program.

FIG. 7 shows the operation of the link relay program. The link relay program 1202 receives the link information from the information access program 1103 (1901), and utilizes a link table 1203 to search the address of the usage judgment point information on Internet corresponding to the link information, which has been sent (1902).

Figures 8, 9:
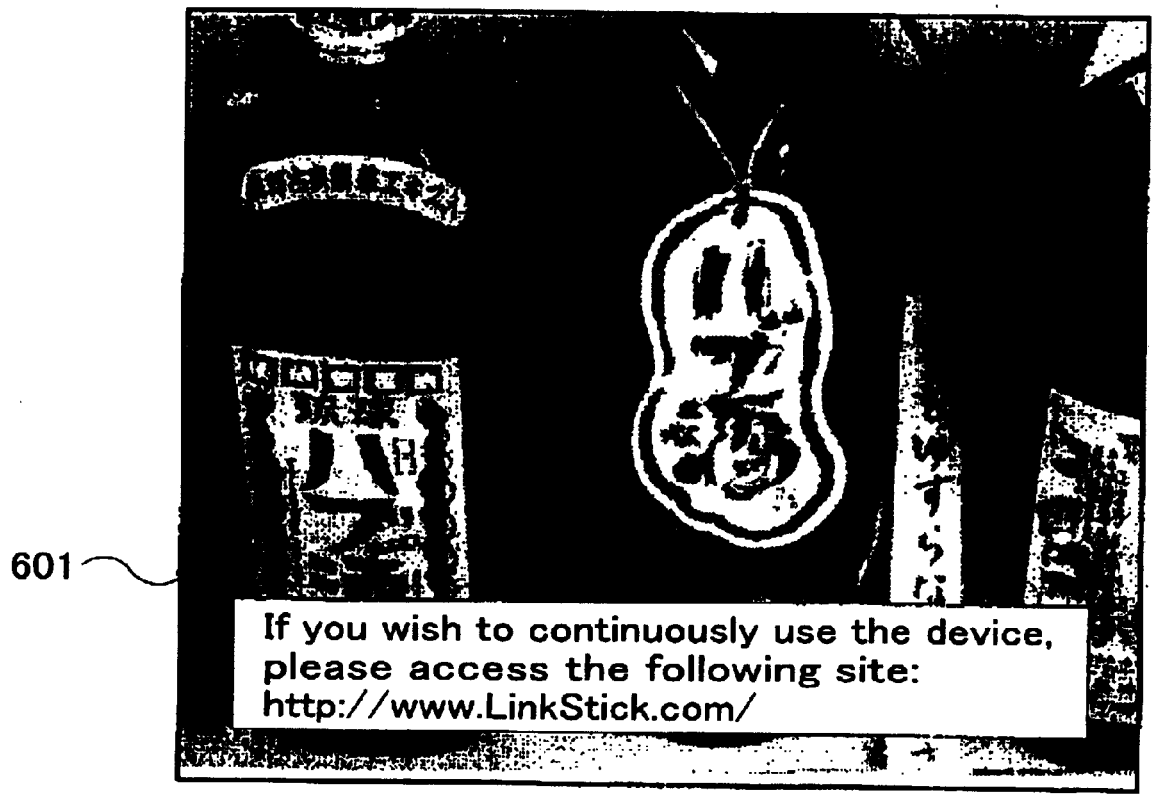
FIG. 8 is a drawing which explains a link table possessed by the link relay server.
FIG. 9 shows a display showing one example of executing a limiter for restricting unintended usage.

FIG. 8 exemplifies the link table. In this case, the link information 1211 is a value of six figures, and as the referring address corresponding to it, the location (address) of the homepage opened by the advertiser 103 on Internet is registered in the link table. Specifically, URL 1212 such as http://www.hitachi.co.jp/, is registered. Also stored in the link table is a point 1213 corresponding to the link.

Furthermore, the link table 1203 possesses an access counter 1214 which holds a number in which the link is referred. The information of the access counter 1214 is used for the later collection of the fee from the advertiser 103.

The link relay server 1201 increases the value of the access counter 1214 (1903), and returns URL 1212 expressing the location of the homepage and the point 1213 relative to the link to PC 1101 (1904).

In order to generate the information to be listed in the link table, the link relay server 1201 possesses a link generation program 1204. When the main constituent 102 of the information delivery service receives a request from an advertiser 103 or such to produce a new link, the link-producing program 1204 is used.

Depending upon the demand of advertiser 103 or such, the link generation program 1204 registers a new link. At this time, the link generation program 1204 searches a number which is not used in the link table 1202, associates the searched number with URL, which is requested to be registered, and then register it into the link table. The advertiser 103 embeds the number assigned by the main constituent 102 of the information delivery service into an advertisement inserted into a publication, e.g., in the form of a bar code. As described previously, one in which link information is printed in any form is called "linked symbol".

Again, referring to FIG. 3 and FIG. 6, the operation of the information access program 1103 will be described. The information access program 1103 increases a value of the usage judgment point 1107 depending upon the value of the point sent from the link relay server 1201 (1805).

For example, if the point sent from the link relay server 1201 is 10, ten points are added to the value of the usage judgment point 1107. Since the point is set per every reference sites, the use of such functions can realize careful service to the user, e.g., much more points are given to the user who accessed the information about goods during the course of campaign.

After increasing of the value of the usage judgment point 1107, the information access program 1130 sends URL returned from the link relay server 1201 to the browser program 1105 (1806). The browser program 1103 utilizes the received URL to refer the homepage on the publicity contents server 1201 and to display it to the user.

The operation where the linked symbol is taken by the camera 1102 to refer the information corresponds to the intended usage (supposed usage) assumed by the main constituent 102 of the image delivery service. Consequently, as described above, by increasing the value of the usage judgment point, a period until the usage of the camera 1102 is restricted is extended.

Next, the operation of the limiter 1109 for restricting unintended usage will be described. The limiter 1109 for restricting the unintended usage is to restrict the use of the camera 1102 in some ways. In this embodiment, the limiter 1109 for restricting unintended usage is embedded in the camera driver 1104. Since the camera driver 1104 is an essential program for use of the camera 1102, it is suitable fort he purpose of monitoring the situation of using the camera 1102 and restricting the use of the camera 1102.

The limiter 1109 for restricting unintended usage is started, when the value of the usage judgment point is decreased to some extent. The cause for decreasing the usage judgment point is that the camera 1102 is continuously used in the usage other than the intended usage. The intended usage is an operation where the linked symbol is taken as described above, and is an operation where the link managed by the main constituent 102 of the information delivery service to refer the information. The usage other than the intended usage is, for example, an operation where the image taken by the camera 1102 is displayed on the display and is stored as a file by the image capture program 1105.

When the limiter 1109 for restricting the usage other than the intended usage is started, for example, a message 601 for restricting the usage other than the intended usage as shown in FIG. 9 is overlapped on the image inputted by the camera 1102. In this case, a text indicating that the camera 102 should be used for the intended usage is overlapped on the image.

Other than a method for overlapping the image, various methods such as for darkening the whole of the image, for turning the image upside down, for reducing the part or whole of the resolution of the image, and for restricting the combination of the image formats with pixels and other method can be considered.

In the case where motion picture is inputted through the camera connected to PC, the frame number inputted per one second is generally from about 5 to about 30. For example, assuming that about 10 images are inputted per second, 300 frames of the images can be inputted until the value of the usage judgment point 1107 is decreased one and, thus, it can be calculated that the camera 1102 can input motion picture for 30 seconds. In this embodiment, since the initial value of the usage judgment point 1107 is set at 10, 3000 frames of the images can be used for inputting the images at the initial state. When utilizing the motion picture, the images having 10 frames per second can be used over a period of about 5 minutes.

In the embodiment mentioned above, the limiter for restricting the usage other than the intended usage according to the present invention is composed of the usage judgment point 1107 and parts of the information access program 1103 and the camera driver 1104. However, it should be noted that the present invention is not restricted thereto. For example, the functions for increasing or decreasing the points and for judging whether or not the point becomes lower than the threshold value can be unified in the judgment part.

Figure 10:
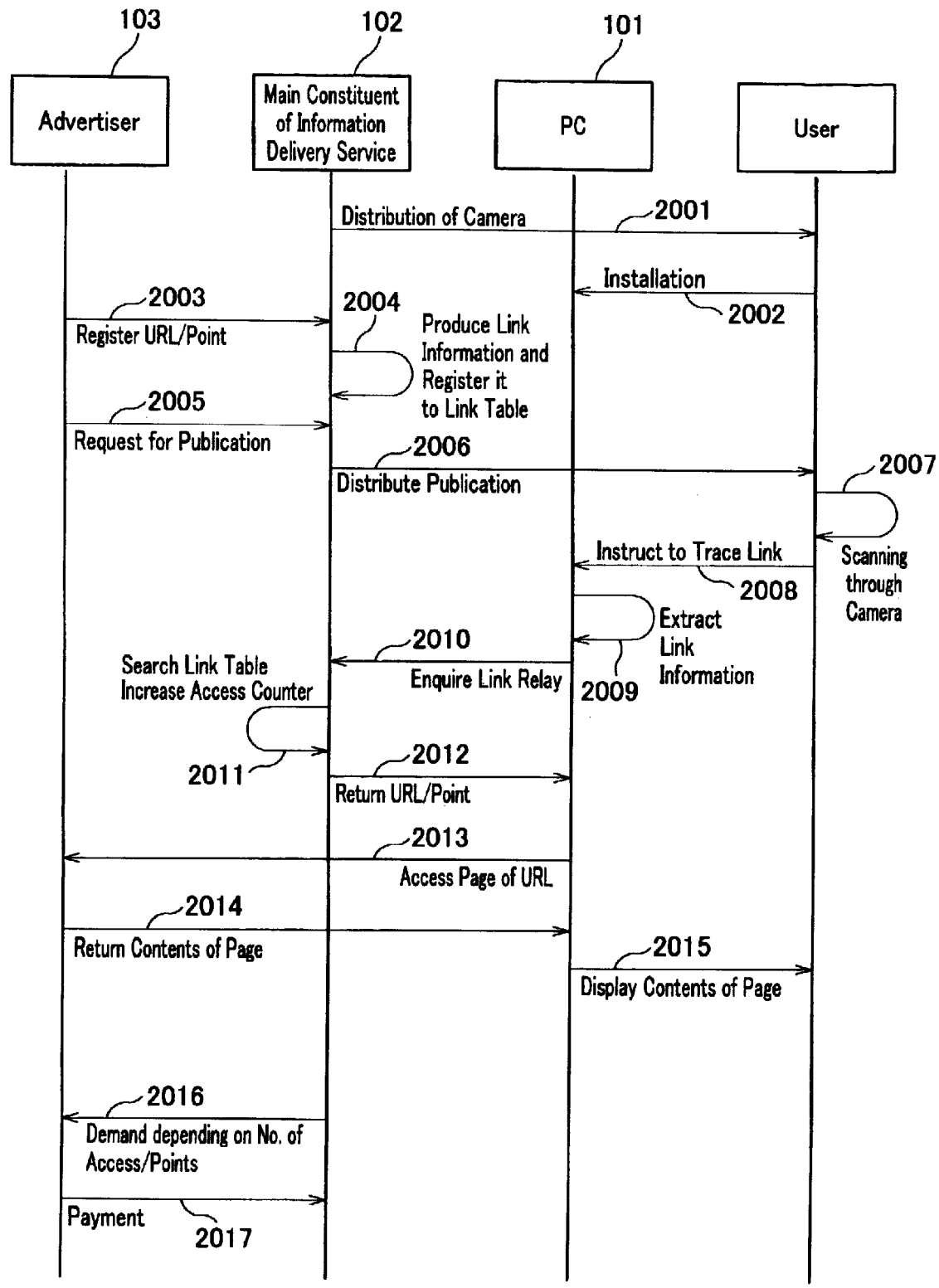
FIG. 10 is a process flow showing one example of a business according to the present invention.

FIG. 10 is a process flow showing one example of a business according to the present invention. In this business flow, the main constituent 102 of the information delivery service, the advertiser 103, PC 1101, which is the information access device, and the user are included.

The main constituent 102 of the information delivery service distributes the camera 1102, which is an inputting part of the information access device and an accompanying program to the user (2001). The user installs the camera in PC 1101 (2002) The advertiser 103 requests the main constituent 102 of the information delivery service to register the address (URL) of the information opened and the point given to the user when the user accesses this URL (2003). The main constituent 102 of the information delivery service generates the link on the basis of the request described above, which is registered in the link table 1203 (2004). At this time, the link generation program 1204 is used.

The advertiser 103 requests the main constituent 102 of the information service to distribute a publication of the main constituent 102 of the information delivery service a publication attached with the link (2005). The main constituent 102 of the information delivery service publishes a publication 104 with the link and distributes the publication 104 to the user.

When the user scans the linked symbol 1401 of the publication 104 through the camera 1102 (2007), it indicates that PC 1101 should trace the link (2008).

PC 1101 extracts the link information from the image of the linked symbol 1401 (2009),and requests the main constituent for relaying the link (2010). The main constituent 102 of the information delivery service searches the link table 1203, increases the access counter concerning the searched item (2011), and returns URL and the point to PC 1101 (2012). PC 1101 utilizes the received URL to access the page of the advertiser 103 (2013).

Based on the access request for access, the advertiser 103 returns the contents of the page to PC 1101 (2014). PC 1101 displays the received contents of the page to the user (2015). At an appropriate time, the main constituent 102 of the information delivery service demands a service fee to the advertiser 103 depending upon the numbers of the access (the numbers of link relay) and points (2016). The advertiser 103 pays a service fee on the demand of the main constituent 103 of the information delivery service (2017).

Here, it is noted that the point is not necessarily required for account. However, if the user continuously gets points through the intended usage, the point obtained becomes high and when the user accesses the page with high points, the period capable of using the information access device becomes longer. For this reason, it is possible to heavily load the fee for the information access device, which is freely distributed to the user by the main constituent 102 of the information delivery service.

According to this embodiment, there is a high possibility to success the business where the whole or part of the information access device is loaded by the main constituent of the information delivery service, and the cost is recovered depending on the usage of the service.

In this embodiment, the information referred by the user through the information access device resides on Internet, but it may be stored in a storage medium such as CD-ROM and DVD-ROM.

Figure 11:
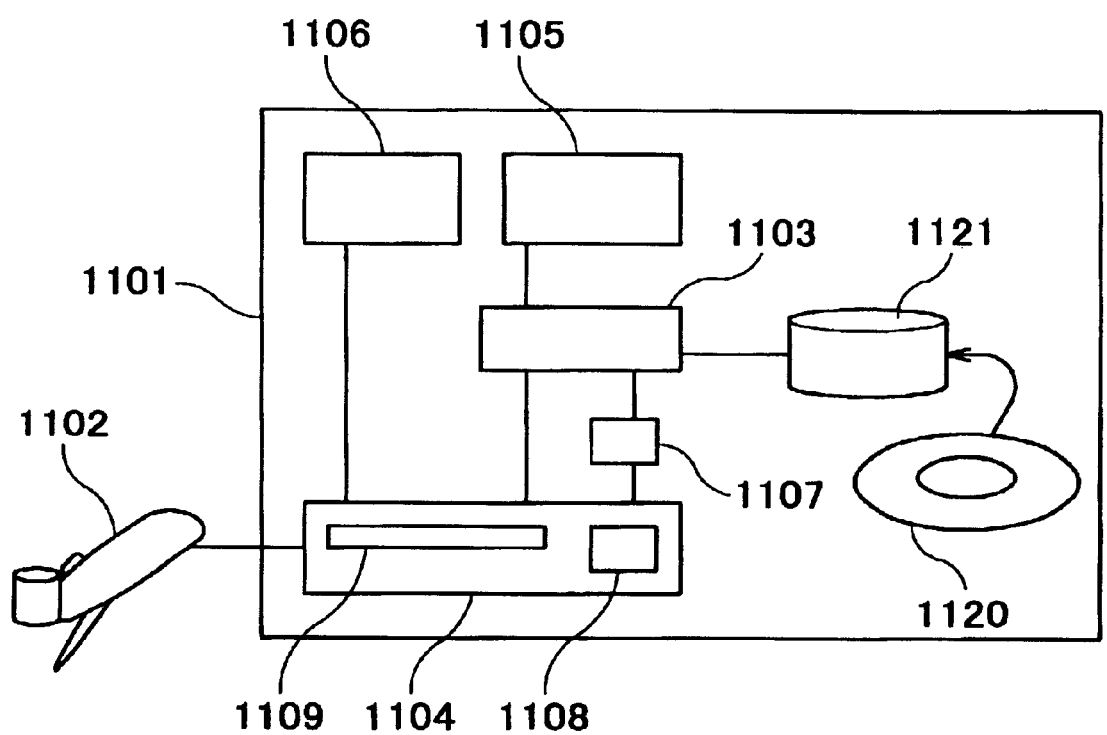
FIG. 11 is a drawing showing a configuration of another embodiment of the present invention utilizing a storage medium.

FIG. 11 shows the embodiment of such a case. When the user inputs the storage medium 1120 such as CD-ROM and DVD-ROM into PC 1101, the storage medium link table 1121 stored in the storage medium 1120 is read.

Into the storage medium link table 1121 is stored the information similar to that of the link table 1203, provided that what is linked is not the address on Internet but is the location of the data in the storage medium 1120.

The location of the data in the storage medium is expressed as URL. As method for expressing a file in the local storage medium, for example, file://k:/data/movile.avi, is used. This expresses the location of the file "movile.avi" residing in a folder "data" in drive "k". As for URL registered in the storage medium link table, such an expression as described above is used.

In the case where the storage medium link table 1121 is read, the information access program 1103 searches the storage medium link table instead of enquiry to the link relay server 1201 to obtain the location of the information corresponding to the linked information.

When being accessed to the information stored in CD-ROM, DVD-ROM or such, the information access program 1103 increases the value of the available point 1106 similar to the case of being accessed to Internet, whereby when the user accesses the information stored in CD-ROM, DVD-ROM or such, the user can continuously use the information access device.

In this embodiment, while the information access device reads the linked information from the printed medium, the present invention is not restricted to such a specific embodiment. For example, PC, IA or PDA itself is assumed to be the information access device, and a specific service, e.g., the reading of a specific news site on Internet, is assumed as the intended usage. The usage other than the intended usage, which can be considered, includes game, management of schedule, Internet connection using the communication company other than the specified vender.

Figure 12:
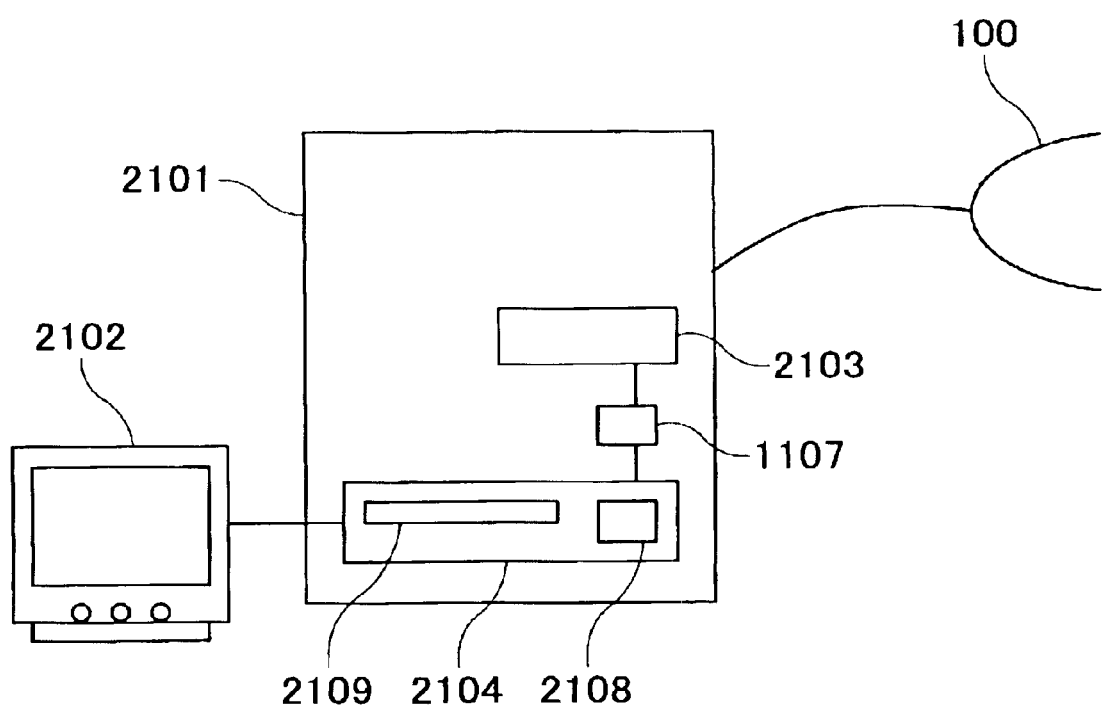
FIG. 12 is a drawing showing a configuration of another embodiment of the present invention utilizing a whole of PC.

FIG. 12 shows an embodiment of such a case. PC 2101 displays the information on a display 2102 via a display driver 2104. The display driver 2104 increases the value of the display frame counter 2108 every one frame of the movie is displayed on the display 2102. This operation is similar to the case where the frame counter 1108 is increased depending upon inputting the image through the camera as shown in FIG. 3.

Also, the display driver 2104 returns the frame counter to zero when the display frame counter 2108 exceeds a given threshold value to decrease the value of the usage judgment point 1107. If the value of the usage judgment point 1107 becomes lower to a prescribed extent, the display driver 2104 starts a limiter 2109 for restricting the displaying of the unintended usage.

The limiter 2109 for restricting the displaying of unintended usage restricts the displaying of the information on the display 2102. For example, a message similar to the message 601 for restricting the usage other than the intended usage as shown in FIG. 6 is overlapped with the displayed image.

A program 2103 for monitoring the information access monitors the origin of sending the data, and increases the usage judgment point 1107 if PC 2101 receives the data from the specific news site. The receiving part intended herein includes, for example, a function of the program 2103 for monitoring the information access.

As described above, considering that PC is used as the information access device and the intended usage thereof is access to a specific site, PC is restricted to use unintended usage when the usage judgment point is decreased. Conversely, by increasing the usage judgment point, the restriction for using unintended usage is moderated.

While the embodiments of the present invention have been described, the present invention is not restricted thereto. For example, an embodiment where a cellular phone or PHS is used as the information access device instead of PC and a camera is used as the information-inputting device is within the scope of the present invention. In this case, in addition to the publication and the storage medium, the linked symbol may be embedded, for example, in an outdoor advertisement.

What is claimed is:

1. An information access device for utilizing an intended information service via an information-inputting device, comprising:
    a usage discrimination part which judges whether the information-inputting device is utilized for said intended information service or for unintended usage, based on prescribed information from said information inputting device, the usage discrimination part increasing an available point when the information-inputting device is utilized for the intended information service and decreasing the available point when the information-inputting device is utilized for unintended usage.

2. The information access device as claimed in claim 1, further comprising a limiter for unintended usage which restricts the use for unintended usage when said usage discrimination part judges a number or period of usage for unintended usage exceeds a threshold value.

3. The information access device as claimed in claim 1, wherein said usage discrimination part allows use of said information access device for unintended usage if the available point satisfies a predetermined condition.

4. The information access device as claimed in claim 1, wherein said information-inputting device is an image-inputting device or a receiving device for said information service.

5. An information access device including an image-inputting device and a personal computer, which is utilized for an information delivery service, said personal computer comprising:
    a driver for inputting link information read from said image-inputting device;
    an information access part which accesses said information delivery service based on the link information from said driver;
    a usage discrimination part having an available point which is increased by access of said information access part and is decreased by using said driver; and
    a limiter for unintended usage which restricts the use for unintended usage when said available point is lower than a threshold value.

6. The information access device as claimed in claim 5, wherein said link information read from the image-inputting device is printed information.

7. The information access device as claimed in claim 6, wherein said printed information is described in a publication or storage medium.

8. The information access device as claimed in claim 5, wherein said restriction through said limiter for unintended usage is deterioration of information read from said image-inputting device.

9. An information delivery system in which an information access device including an information-inputting device and a server for an information delivery service are connected to a network, and which performs an information delivery service to said information access device, said information access device comprising:
    usage discrimination part which judges whether the information-inputting device is utilized for said information delivery service or for unintended usage, based on prescribed information from said information inputting device; and
    a limiter for unintended usage which restricts the use for unintended usage when said usage discrimination part judges a number or period of usage for unintended usage exceeds a threshold value.

10. The information delivery system as claimed in claim 9, wherein said server for said information delivery service has a link table for returning an access address corresponding to the link information from said information access device and an available point, which moderates the restriction of the usage by said discrimination part.

* * * * *